S. DUCK.
Mortising Machine.
No. 197,111. Patented Nov. 13, 1877.
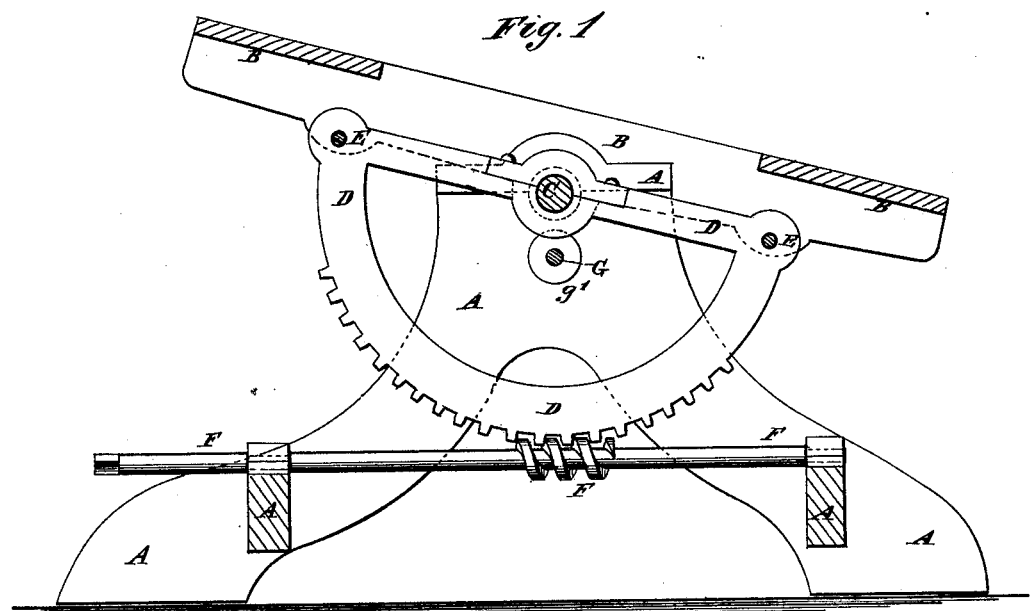
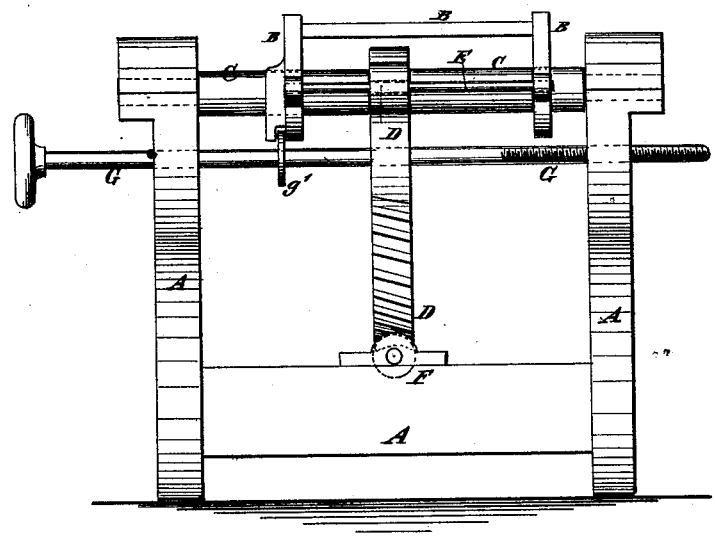
WITNESSES: INVENTOR: S. Duck
BY Munn & Co.
ATTORNEYS.

UNITED STATES PATENT OFFICE.

SIMEON DUCK, OF VICTORIA, BRITISH COLUMBIA, ASSIGNOR TO HIMSELF AND JOSHUA DAVIES, OF SAME PLACE.

IMPROVEMENT IN MORTISING-MACHINES.

Specification forming part of Letters Patent No. 197,111, dated November 13, 1877; application filed August 24, 1877.

*To all whom it may concern:*

Be it known that I, SIMEON DUCK, of Victoria, British Columbia, have invented a new and useful Improvement in Mortising-Machines, of which the following is a specification:

Figure 1 is a vertical longitudinal section of a part of a mortising-machine to which my improvement has been applied, and Fig. 2 an end view of the same.

Similar letters of reference indicate corresponding parts.

The object of this invention is to improve the construction of the mortising-machine for which Letters Patent No. 171,360 were granted to me, December 21, 1875, so as to make it simpler in construction, lighter and neater in appearance, and less expensive in manufacture.

The invention consists in the segmental gear in a mortising-machine, rocking upon a journal on the main shaft, upon which the table tilts and slides, and connected with said table by two rods attached to said table, and passing through and sliding in holes in the ends of the said gear, so that the table may be tilted by the segmental gear while sliding freely upon it, as hereinafter fully described.

A represents the base-frame, and B the tilting table, of the machine. C is the main shaft, upon which the table B rocks and slides. D is a segmental gear, which rocks upon a journal on the middle part of the main shaft C, but has no lateral movement upon it. E are two rods, the ends of which are attached to the frame of the table B, and which pass through and slide in holes in the ends of the segmental gear D, so that the said table may be tilted by the movements of the said gear, and, at the same time, may be free to slide laterally. The teeth of the segmental gear D mesh into the teeth of the endless screw F, which is swiveled to the frame A, and may be turned by hand or by any convenient power. The table B is adjusted laterally by a screw, G, that passes through holes in the frame A, and has a collar, $g'$, attached to it, which enters a groove in the bearing of the table B, or in a block attached to said bearing.

Having thus described my invention, I claim as new and desire to secure by Letters Patent—

In a mortising-machine, the worm-wheel D, rocking upon a journal on the main shaft C, upon which the table B tilts and slides, and connected with said table B by two rods, E, attached to said table, and passing through and sliding in holes in the ends of the said gear D, so that the table may be tilted by the gear D, while sliding freely upon it, substantially as herein shown and described.

SIMEON DUCK.

Witnesses:
LAWRENCE GOODACRE,
JOHN VAUGHAN.